(12) United States Patent
Jonderko et al.

(10) Patent No.: US 7,033,522 B2
(45) Date of Patent: Apr. 25, 2006

(54) PULVERULENT, WATER-DISPERSIBLE, BLOCKED POLYISOCYANATE ADDUCTS, A PROCESS FOR THE PREPARATION AND THEIR USE

(75) Inventors: Klaus-Peter Jonderko, Herne (DE); Klaus Janischewski, Dorsten (DE); Lutz Mindach, Marl (DE)

(73) Assignee: Degussa AG, Marl (DE)

( * ) Notice: Subject to any disclaimer, the term of this patent is extended or adjusted under 35 U.S.C. 154(b) by 294 days.

(21) Appl. No.: 09/963,423

(22) Filed: Sep. 27, 2001

(65) Prior Publication Data

US 2002/0061999 A1    May 23, 2002

(30) Foreign Application Priority Data

Sep. 27, 2000  (DE) ................... 10047762

(51) Int. Cl.
*C07C 269/02*  (2006.01)
*C07C 271/02*  (2006.01)
*C07C 271/06*  (2006.01)
*C07C 273/00*  (2006.01)
*C07C 275/00*  (2006.01)

(52) U.S. Cl. ............... 252/182.2; 252/182.21; 252/182.22; 524/591; 524/839; 524/840; 528/45; 528/71; 528/67; 528/76; 544/222; 560/24; 560/25; 560/26; 560/115; 560/157; 560/158; 564/32; 564/38; 564/44

(58) Field of Classification Search ............... 528/45, 528/71, 76, 67; 524/591, 839, 840; 252/182.2, 252/182.21, 182.22; 544/222; 560/24, 25, 560/26, 115, 157, 158; 564/32, 38, 44
See application file for complete search history.

(56) References Cited

U.S. PATENT DOCUMENTS

| | | | |
|---|---|---|---|
| 3,412,054 A | 11/1968 | Milligan et al. | 524/591 |
| 4,480,008 A | 10/1984 | Farronato et al. | 428/425.8 |
| 5,314,964 A | 5/1994 | Lucas | 525/293 |
| 5,508,370 A * | 4/1996 | Reiff et al. | 528/45 |
| 5,583,176 A * | 12/1996 | Haberle | 524/591 |
| 5,607,482 A * | 3/1997 | Reiff et al. | 8/495 |
| 5,693,737 A * | 12/1997 | Reiff et al. | 528/45 |
| 5,811,190 A | 9/1998 | Laas et al. | 428/423.1 |
| 6,096,805 A * | 8/2000 | Lange et al. | 523/336 |
| 6,187,860 B1 * | 2/2001 | Konig et al. | 524/591 |
| 6,348,521 B1 * | 2/2002 | Lange et al. | 523/336 |
| 6,727,341 B1 * | 4/2004 | Lange et al. | 528/45 |

FOREIGN PATENT DOCUMENTS

| | | |
|---|---|---|
| DE | 27 08 611 | 5/1978 |
| DE | 44 33 874 | 3/1996 |
| DE | 197 11 741 | 9/1998 |
| EP | 0 537 578 | 4/1993 |
| EP | 0 839 847 | 5/1998 |
| EP | 839 847 | 5/1998 |
| WO | 99/52961 | * 10/1999 |

OTHER PUBLICATIONS

W. Siefken, Justus Liebigs Annalen Der Chemie, vol. 562, pp. 75-136, "Mono- Und Polyisocyanate" 1948.

* cited by examiner

*Primary Examiner*—Rabon Sergent
(74) *Attorney, Agent, or Firm*—Oblon, Spivak, McClelland, Maier & Neustadt, P.C.

(57) ABSTRACT

A blocked polyisocyanate adduct including 5 to 95% by weight of at least one isocyanate component having at least one NCO group, the isocyanate component selected from the group consisting of aliphatic, cycloaliphatic and aromatic isocyanates, wherein the isocyanate has an average molecular weight of up to 1000 g/mol and an average NCO functionality of 2–4; 5 to 70% by weight of at least one hydrophilicizing component containing at least one group which is reactive toward the at least one NCO group; at least one blocking agent for blocking from 95 to 100% of the NCO groups which do not react with the hydrophilicizing component; and up to 15% by weight of at least one neutralizing agent.

22 Claims, No Drawings

PULVERULENT, WATER-DISPERSIBLE, BLOCKED POLYISOCYANATE ADDUCTS, A PROCESS FOR THE PREPARATION AND THEIR USE

BACKGROUND OF THE INVENTION

1. Field of the Invention

The present invention relates to pulverulent, water-dispersible, blocked polyisocyanate adducts of high storage stability which by dispersion in water and by combination with further binder dispersions are able to function as curing components in aqueous baking enamels.

2. Discussion of the Background

Aqueous dispersions of fully or partly blocked polyisocyanates have for years increasingly been used as curing agents in aqueous baking enamels. As aqueous dispersions of copolymers on an acrylic basis, various isocyanate-containing addition polymers are principally described (U.S. Pat. No. 5,314,964, DE 44 33 874). The solid copolymers have been obtainable by drying methods from the isocyanate-functionalized polymer dispersions obtained by free-radical polymerization. In some cases, with the assistance of protective colloids during drying (DE 197 11 741) and in combination with other binders, the redispersible powders described are employed in coating compositions and adhesives. Disadvantages of the known preparation methods are the need to remove fairly large amounts of water, which acts as a solvent during the free-radical polymerization, and the low blocked isocyanate functionalities content. Simple blocked polyisocyanate curing agents, present in powder form and able by dispersion to function as curing agent in aqueous baking enamels, have not been disclosed to date.

Processes for preparing high-solids aqueous dispersions from (blocked) polyisocyanates in accordance with the prior art make use of emulsifiers and protective colloids to hydrophilicize the otherwise hydrophobic polyisocyanates. These can either be mixed in physically or be incorporated into the resin structure. A disadvantage of the first method is the permanent hydrophilicity of the external emulsifiers, which leads to swelling and softening in the resultant coatings under the influence of moisture thereby ruling out exterior applications of such a dispersion. The second method is based on the reaction of (possibly partly blocked) polyisocyanates with a compound which carries a potentially hydrophilic group, after which conversion into a purely aqueous system takes place by dispersion and distillation of any cosolvent present.

For the preparation of the hydrophilicized polyisocyanate adducts, it is usually necessary, due to viscosity, to use organic auxiliary solvents (for example, EP 0 839 847 and references cited therein). The solvents, however, have to be removed with some effort from the resulting aqueous dispersions. The resulting dispersions can be designated as virtually free from auxiliary solvents. In all of the systems thus prepared, however, the limited storage stability of the dispersions is considered to be problematic.

OBJECTS OF THE INVENTION

One object of the present invention is water-dispersible blocked polyisocyanate adducts of high storage stability in powder form. As blocking agents it is possible to use all known blocking agents. The preparation process is preferably carried out without the use of water.

SUMMARY OF THE INVENTION

The present invention provides pulverulent, water-dispersible, blocked polyisocyanate adducts comprising the reaction product of the following components:
  A) from 5 to 95% by weight of at least one aliphatic, cycloaliphatic or aromatic isocyanate component having an average molecular weight of up to 1000 g/mol and an average NCO functionality of 2–4;
  B) from 5 to 70% by weight of at least one potentially ionic and/or nonionic hydrophilicizing component containing at least one group which is reactive toward NCO groups;
  C) at least one blocking agent, from 95 to 100% of the remaining NCO groups of component A being blocked;
  D) from 0 to 15% by weight of at least one neutralizing agent.

It has been found that the pulverulent, water-dispersible, blocked polyisocyanate adducts of the invention exhibit surprisingly high storage stability and are dispersible in water without problems even after storage at customary temperatures. The polyisocyanate adducts of the invention are able to be prepared in water-free form by the process of the present invention.

In contrast to the conventionally prepared dispersions, the pulverulent, water-dispersible, blocked polyisocyanate adducts of the present invention affords the decisive advantage of virtually unrestricted storage stability. Since conversion into the dispersion form does not take place until shortly before use or shortly before dispatch, it is possible to circumvent the storage stability problems of conventionally prepared dispersions.

With respect to the transport costs of the aqueous dispersion of the present invention, the system presented offers a fundamental advantage in that there is no need to transport the unreactive component water.

A further advantage of the water-dispersible, pulverulent polyisocyanate adducts is the possibility of incorporating the solid directly into other binder dispersions. The user is therefore in a position to be able to formulate the desired solids content and the required spray viscosity on an individual basis.

Moreover, curing agent powders based on different polyisocyanates may readily be mixed with one another to give the desired profile of properties of the coating. The simple and controlled setting of the NCO/OH proportions with respect to the binder dispersions used is a further advantage of the direct incorporation of the powders described.

It is also possible to easily combine different curing mechanisms: for example, simultaneous isocyanate and melamine crosslinking in conjunction with an existing hydroxyl component.

Finally, it is possible to use and combine blocking agents having storage stabilities which are inadequate in the context of conventional dispersions production (e.g., alkyl malonates/acetoacetic esters).

Suitable as component A are all aliphatic, cycloaliphatic, araliphatic, aromatic or heterocyclic isocyanates, as described, for example, by W. Siefken in Liebigs Annalen der Chemie, 562, pages 75 to 136. A detailed description of the isocyanates which can be used is given in EP 0 537 578, page 3, lines 10 to 45. Suitable compounds are all diisocyanates/polyisocyanates/adducts having a $T_g$ of greater than 50° C., preferably in the range from 60 to 90° C.

Preferred isocyanates are aliphatic and/or cycloaliphatic polyisocyanates having an average molecular weight of up to about 1000 g/mol and an average isocyanate functionality of from 2 to 4. Due to the high light and weathering stability of the coating films able to be produced from them. Examples include simple diisocyanates such as 1,6-diisocyanatohexane (HDI), bis(4-isocyanatocyclohexyl)methane (HMDI), 1,5-diisocyanato-2-methylpentane (MPDI), 1,6-diisocyanato-2,4,4-trimethylhexane (TMDI) and also, in particular, 3-isocyanatomethyl-3, 5,5-trimethylcyclohexyl isocyanate (IPDI) and/or technical mixtures thereof. Moreover, it is possible to use polyisocyanates obtained by reaction with bifunctional co-reactants (for example diols, diamines, etc.). Another preferred class of polyisocyanates are compounds having more than two isocyanate groups per molecule that are prepared by trimerizing, allophanatizing, biuretizing and/or urethanizing the simple diisocyanates. Examples are the reaction products of simple diisocyanates, such as IPDI, HDI and/or HMDI, for instance, with polyhydric alcohols (e.g., glycerol, trimethylolpropane, pentaerythritol) and/or polyfunctional polyamines or the triisocyanurates, obtainable by trimerizing the simple diisocyanates such as IPDI, HDI and HMDI. Examples of representatives of the aromatic polyisocyanates are tetramethylenexylylene diisocyanate (TMXDI), 2,4-diisocyanatotoluene and/or its technical mixtures with 2,6-diisocyanatotoluene, and also 4,4'-diisocyanatodiphenylmethane and/or its technical mixtures with 2,4'-diisocyanatodiphenylmethane.

The hydrophobic isocyanate component A is converted into water-dispersible hydrophilicized polyisocyanate adducts by reaction with a suitable hydrophilicizing agent B. Suitable hydrophilicizing agents contain at least one NCO-reactive group having at least one hydrogen atom which is active in accordance with the Zerevitinov test, and at least one hydrophilic or potentially hydrophilic group. Preferred suitable NCO-reactive groups comprise hydroxyl groups and also primary and secondary amino groups. Hydrophilic groups may, among others, again be hydroxyl groups, which may be in the hydrophilicizing agent or may form from groups present in the hydrophilicizing agent. Preferred hydrophilic groups are, the sulfonic acid group and phosphonic acid group. These are comparatively highly dissociated and are therefore regarded as hydrophilic. They may be converted into the ionically hydrophilic sulfonate or phosphonate groups, respectively, by neutralization. A further suitable hydrophilicizing agent is the carboxyl group, which is classified as a potentially hydrophilic group since it undergoes only weak dissociation. By neutralization, however, it can be converted into the highly dissociated, ionically hydrophilic carboxylate group. A further suitable hydrophilic group is the tertiary amino group, which by neutralization with an acid is converted into the ionically hydrophilic quaternary ammonium group.

Examples of such hydrophilicizing agents are mono- and polyhydroxyalkylcarboxylic acids as described in U.S. Pat. No. 3,412,054, incorporated herein by reference, preferably 2,2-dimethylolacetic acid, 2,2-dimethylolpropionic acid, 2,2-dimethylolbutyric acid, 2,2-dimethylolpentanoic acid, dihydroxysuccinic acid, 1,1,1-trimethylolacetic acid, hydroxypivalic acid, or mixtures of such acids. Also suitable are mono- and polyhydroxysulfonic acids and mono- and polyhydroxyphosphonic acids such as 2,3-dihydroxypropanephosphonic acid. Further suitable hydrophilicizing agents are mono- or polyfunctional aminocarboxylic acids, such as 5-diaminovaleric acid, 3,4-diaminobenzoic acid, 2,4-diaminotoluenesulfonic acid or 11-aminoundecanoic acid, for example.

Besides these, nonionic components are also suitable for hydrophilicizing otherwise hydrophobic polyisocyanates. These components generally comprise polyethers containing per molecule one or two isocyanate-reactive groups, especially hydroxyl groups. From 80 to 100% by weight of the polyether chains comprise ethylene oxide units, which may be accompanied, in accordance with the comments made, by propylene oxide units. Suitable such nonionic-hydrophilic structural components are, for example, monofunctional polyethylene glycol monoalkyl ethers having molecular weights of >350 g/mol.

Moreover, it is possible to combine ionogenic and non-ionogenic hydrophilicizing agents. Less preferable, but also possible, is combining ionogenic and/or nonionogenic hydrophilicizing agents with nonionogenic hydrophilicizing agents which are mixed physically into the curing agent powder.

The hydrophilicizing agent should of course only be employed in an amount such that sufficient isocyanate groups remain for the crosslinking reaction with the binder resin.

If the hydrophilicizing agent B introduces a potentially hydrophilic group, e.g., a carboxyl group or a tertiary amino group, into the polyisocyanate, this group can be converted into an ionically hydrophilic group by subsequent neutralization.

In principle, neutralization may take place both during powder preparation, following reaction of components A and B or A and B and C, and during the final dispersing operation. In the first case, neutralized powders are obtained, and the latter case, unneutralized powders are obtained, which may be incorporated by dispersion into aqueous solutions of the desired neutralizing agents.

The neutralizing agent used is a base if the potentially hydrophilic group is an acidic group, for example, the carboxyl group, or an acid in the case of basic potential hydrophilic groups, such as a tertiary amino group. The bases may be inorganic bases, such as ammonia or hydrazine, or organic bases. Preference is given to ammonia and also primary, secondary or tertiary amines such as ethylamine, n-propylamine, dimethylamine, di-n-butylamine, cyclohexylamine, benzylamine, morpholine, piperidine and triethanolamine. Particularly preferred, because of their inert behavior with respect to blocked NCO functions, are tertiary amines such as N,N-dimethylethanolamine, N,N-diethylaminoethanol, triethylamine, tri-n-propylamine and tri-n-butylamine. Suitable acids are udiciously carboxylic acids, such as formic acid, lactic acid, acetic acid and/or benzoic acid.

Suitable blocking agents C for the free NCO groups are aliphatic, cycloaliphatic and alkylaromatic (monohydric) alcohols, examples being lower aliphatic alcohols such as methyl alcohol and ethyl alcohol, the various propyl, butyl and hexyl alcohols, heptyl, octyl, nonyl and decyl alcohols, and also unsaturated alcohols such as propargyl alcohol or allyl alcohols, cycloaliphatic alcohols such as cyclopentanol, cyclohexanol, alkylaromatic alcohols such as benzyl alcohol, p-methyl-, p-methoxy- and p-nitrobenzyl alcohol, and monoethers of glycols such as ethylene glycol monomethyl ether, ethylene glycol monobutyl ether. Further blocking agents are phenol, ketoximes, with 3 to 20 carbon atoms, preferably 3 to 10 carbon atoms, such as acetone oxime, methyl ethyl ketone oxime (i.e. butanone oxime), hexanone oxime (methyl butyl ketone oxime), heptanone oxime (methyl n-amyl ketone oxime), octanone oxime and cyclohexanone oxime, CH-acidic compounds such as alkyl malonates, acetoacetic esters and cyanoacetic esters having in each case 1 to 4 carbon atoms in the ester group, NH-acidic compounds such as caprolactam, and amino alcohols such as diethylethanolamine.

The auxiliary solvents needed to prepare the blocked and hydrophilicized polyisocyanate generally comprise customary inert paint solvents having a relatively low boiling point (<100° C.). Suitable solvents of this kind are, for example, acetone, methyl ethyl ketone or tetrahydrofuran.

The invention likewise provides a process for the water-free preparation of pulverulent, water-dispersible blocked polyisocyanate adducts by reacting A) from 5 to 95% by weight of at least one aliphatic, cycloaliphatic or aromatic isocyanate component having an average molecular weight of up to 1000 g/mol and an average NCO functionality of 2–4 with B) from 5 to 70% by weight of at least one potentially ionic and/or nonionic hydrophilicizing component containing at least one group which is reactive toward NCO groups in an organic auxiliary solvent, followed by blocking of the remaining NCO groups with C) at least one blocking agent, from 95 to 100% of the remaining NCO groups of component A being blocked, if desired, neutralizing with D, and subsequently removing the organic auxiliary solvent.

In a first step, an adduct of aliphatic, araliphatic, cycloaliphatic and/or aromatic polyisocyanates and components capable of hydrophilicization is prepared in an organic auxiliary solvent. This is followed by the blocking of the remaining free isocyanate groups with suitable blocking agents and the removal of the solvent used to prepare the prepolymer, to give the desired pulverulent adducts. If desired, the reaction with the neutralizing agent is carried out beforehand.

The process described above offers numerous advantages in preparation of pulverulent polyisocyanate adducts. In comparison to conventionally prepared dispersions, the distillative removal of the solvent which may in some cases be necessary for adduct preparation, is less time-consuming and hence less costly, since pure solvent rather than, as usual, an (azeotropic) mixture is to be removed. Moreover, less energy is needed to remove the solvent because no water is evaporated. Since the pure solvent is recovered, it can be reintroduced into the production chain, thereby leading to a significant reduction in solvent consumption.

To prepare the polyisocyanate adducts of the invention, hydrophobic polyisocyanate (component A) is reacted with the hydrophilicizing agent (component B) in the presence of an auxiliary solvent and, if desired, catalyst. Depending on the viscosity, the hydrophobic polyisocyanate is judiciously employed as a solution in an appropriate auxiliary solvent, having a solids content of from about 40 to 80% by weight. Suitable catalysts include organic tin salts such as dibutyltin diacetate or dibutyltin dilaurate. For example, the reaction begins at room temperature and then the temperature is raised to about 120° C. in order to complete the reaction. The reaction mixture is normally held at reflux for a certain time. It is preferably operated at 40 to 100° C. At these temperatures, the potentially hydrophilic groups of the hydrophilicizing agent are generally inert, or virtually inert, with respect to isocyanate groups.

In practice, the hydrophilicizing agent is employed in an amount such that there is on average not more than one NCO-reactive function of the hydrophilicizing agent, intended for linking, for each polyisocyanate molecule. In the case of dimethylolpropionic acid, therefore, not more than 1 mol of the acid is used for 2 mol of polyisocyanate. It is advantageous to employ not more than about 1 equivalent of the NCO-reactive function, intended for linking, per mole of polyisocyanate. In each case, a mixture is produced with random distribution of the hydrophilicizing groups. This mixture is regarded as a hydrophilically modified polyisocyanate adduct in the context of the invention, even if it does not contain hydrophilically modified components.

Depending on the blocking agent used, blocking takes place at room temperature or at an elevated temperature of from 40 to 100° C. The blocking reaction leads to temperature-dependent equilibrium. The optimal temperature for a given polyisocyanate mixture and a given blocking agent can easily be determined by means of preliminary rangefinding tests. The amount of blocking agent required is commonly determined by the number of isocyanate functions to be blocked. It is preferable to use stoichiometric amounts or a slight excess of blocking agent in order to ensure complete reaction of the blocking agent. Thus, neither the product nor the auxiliary solvent, which may be intended for re-use, is contaminated with blocking agent.

In addition, it is possible to mix hydrophobic polyisocyanate fractions and/or to hydrophilicize only some of the polyisocyanate molecules present.

For the blocking of the free isocyanate functions, it is possible to treat a mixture of the resulting hydrophilically modified polyisocyanate (A+B) and additional hydrophobic polyisocyanate (A), the latter may be in the form of a solution in an appropriate auxiliary solvent with a strength of from about 40 to 80 percent by weight, in the stated proportion with the blocking agent. As already mentioned, the mixture to be blocked may also be produced by reacting hydrophobic polyisocyanate with a corresponding substoichiometric amount of hydrophilicizing agent and, if desired, with neutralizing agent. Alternatively, the hydrophilic modified polyisocyanate and the hydrophobic polyisocyanate may each be blocked individually, and the resulting blocked products mixed. To facilitate the mixing operations, it is possible in all cases to add an additional quantity of auxiliary solvent if desired.

It is also possible to carry out partial blocking of the hydrophobic polyisocyanate first and then react the remaining isocyanate groups with the hydrophilicizing agent in order to convert potentially hydrophilic groups, if appropriate, into ionically hydrophilic groups by neutralization, and then to mix the resulting blocked hydrophilically modified polyisocyanate, if appropriate, with further blocked hydrophobic polyisocyanate. However, this is a less advantageous procedure, since the hydrophilicization reaction takes an uneconomically long time owing to the lower isocyanate group concentration.

If the hydrophilicizing agent has initially introduced only potentially hydrophilic groups, further auxiliary solvent is added, if desired, and then the solution of the blocked polyisocyanates is neutralized in order to convert the potentially hydrophilic groups into ionically hydrophilic groups. As discussed, it is generally advisable to neutralize groups which are of relatively high acidity, and, thus, hydrophilicity. In both cases, the neutralizing agent is used in stoichiometric or substoichiometric amounts. It is possible to influence the particle size and thus the viscosity of the dispersions obtained from the pulverulent adducts by varying the amount of the neutralizing agent. The greater the deficit, the larger the particles and the less viscous the resultant dispersion. On the other hand, the ionic hydrophilic groups produced as a result of the neutralization promote the dispersion of the blocked polyisocyanate adducts, so that no less than 50 mol % of neutralizing agent should be used. The optimal amount is also dependent on the proportion of blocked hydrophilically modified polyisocyanate to blocked hydrophobic polyisocyanate and can easily be determined for a particular dispersion.

Alternatively, however, it is also possible to use polyisocyanate adducts which have not been neutralized. Such adducts, in powder form, may be stirred into aqueous solutions of the neutralizing agents to be used. Here, the ionically hydrophilic groups are not formed from the potentially hydrophilic groups until this step.

In a subsequent step, the polyisocyanate adducts of the invention are freed from their auxiliary solvent. Suitable techniques for this are all known industrial techniques for removing organic solvents to give solids. It is possible, in principle, to remove the solvent by distillation (under reduced pressure if appropriate) and to obtain the powders, for example, in an appropriate extruder by means of freeze drying or fluidized bed drying and a final grinding operation. Particularly advantageous is the use of spray drying technology, which combines both particle formation and drying in one process step. Spray drying takes place in customary spray drying units, in which atomization may take place by means of single, dual or multi-fluid nozzles or else by means of a rotating disk. Depending on the unit and on the $T_g$, nature and structure of the resin, the exit temperature is generally chosen such that no unwanted unblocking occurs, depending on the chosen blocking agent. Through an appropriate choice of design and operating mode of the spray dryer it is possible to control particle diameters (and thus bulk densities), residual solvent contents, and yields of pulverulent polyisocyanate adducts.

Besides the known parameters such as resin structure, degree of neutralization and neutralizing agent, the dispersibility of the pulverulent polyisocyanate adducts obtained is also dependent essentially on the particle size of the powders to be dispersed. Best results are obtained with systems having particle diameters of from about 1 to 1000 µm, preferably with values from 1 to 300 µm. The amount of residual solvent in the resultant powder should be <1%, preferably less than 0.2% by weight.

The present invention additionally provides for the use of the pulverulent polyisocyanate adducts of the invention in aqueous dispersions as crosslinker resins.

By incorporating the pulverulent polyisocyanate adducts of the invention into water or other binder dispersions, it is possible to obtain stable dispersions, free of auxiliary solvent, possessing very good compatibility with customary paint binders. For this purpose, the pulverulent polyisocyanate adducts are introduced into water with stirring at temperatures from room temperature to about 90° C. After cooling to room temperature, if appropriate, stable, high-solids dispersions are obtained which deposit less than 1% by mass of the solids they contain when stored at room temperature for 6 months or at 60° C. for 4 to 8 weeks. This deposited solid, and any relatively large solid fractions which may separate out under nonoptimal conditions, may be rapidly and durably redispersed by applying correspondingly high shear forces.

The pulverulent polyisocyanate adducts of the invention may be used both in powder coating formulas and in aqueous dispersions as crosslinker resins for organic polyhydroxyl compounds for the preparation of baking enamels.

The stable and high-solids aqueous dispersions, which are free of auxiliary solvents, are suitable as crosslinking agents for heat-crosslinking, storage-stable, one-component coating systems, preferably for the preparation of environmentally compatible, water-thinnable polyurethane coating systems, by combination with aqueous film-forming resins, i.e., aqueous solutions, dispersions or emulsions and/or other water-soluble systems comprising polymeric resins containing on average more than 1.5 NCO-reactive groups, such as hydroxyl or amino groups, in each molecule. For this purpose, dispersions are combined with the aqueous film-forming resins, preferably in amounts such that there is one NCO-reactive group of the film-forming resin for each NCO group of the polyisocyanate adduct. If desired, further crosslinkers familiar to one skilled in the art, such as melamine resins and/or known auxiliaries, examples being flow, gloss and/or adhesion promoter additives, are added. Directly or following dilution with water in order to adjust the viscosity, the finished coating material is applied in conventional manner to the substrate that is to be coated. Preferably, the coating is first dried and then crosslinked at from about 80° C. to 250° C., with elimination of the blocking agent.

The examples which follow are intended to illustrate the invention although variations may be made without restricting the scope of the invention.

EXAMPLE 1

Preparation of a Neutralized Pulverulent Polyisocyanate Adduct

Preparation of the Hydrophilic Polyisocyanate (A+B)

741.2 g of IPDI isocyanurate and 222.0 g of IPDI are dissolved with stirring in 451.4 g of acetone. 22.0 g of a 10% strength solution of dibutyltin dilaurate in acetone and 134.0 g of powdered dimethylolpropionic acid are added at room temperature with stirring and the mixture is subsequently heated to about 60° C., so that reflux is established. The mixture is stirred under reflux for a further 6–8 h until all of the dimethylolpropionic acid has dissolved and the NCO number of the solution is from 7.8 to 8.0% NCO.

Blocking (C)

The solution prepared above is cooled to about 40 to 45° C. and, with stirring and cooling, 253 g of methyl ethyl ketoxime are added at a rate such that the temperature remains within a range from 40 to 50° C. The solution is stirred at this temperature for a further 30 minutes and then cooled, with stirring, to 30° C.

Neutralization (D)

45.6 g of dimethylaminoethanol are added at room temperature, with stirring, to 1100 g of the 60% strength acetone solution.

Obtaining Powder

In a Teflon-clad spray drying tower, the resulting neutralized solution is dried under an inert gas atmosphere, using a two-fluid nozzle (in order to generate fine particles) or a one-fluid nozzle (in order to generate relatively coarse particles) in cross-countercurrent mode.

Depending on the mode of spray drying, pulverulent polyisocyanate adducts having an average particle diameter of from 5 to 400 µm and bulk densities of from 40 to 500 g/l are obtained. The pulverulent products obtained all feature residual solvent contents of <0.2% by weight.

Dispersion 413.0 g of deionized water are warmed to about 40° C. and 120.0 g of pulverulent polyisocyanate adduct are added in portions with stirring. The stirring speed is increased and the mixture is heated to about 75° C. After a number of minutes at this temperature, the experiment is ended and the solution is cooled to room temperature.

This gives a virtually transparent dispersion having a solids content of 22.5% (to DIN 53216 at 105° C.), a pH of 8.5 and a viscosity of <30 mPa s (to DIN 53019 at D=200 s$^{-1}$)

There is no coagulation or sedimentation on storage of the dispersion for a period of 6 months at room temperature or of 4 weeks at 50° C. During this time, the dispersion can be used without restriction.

EXAMPLE 2

Preparation of a Non-neutralized Pulverulent Polyisocyanate Adduct

Preparation of the Hydrophilic Polyisocyanate (A+B)

741.2 g of IPDI isocyanurate and 262.0 g of HMDI are dissolved with stirring in 468.6 g of acetone. 22.0 g of a 10% strength solution of dibutyltin dilaurate in acetone and 134.0 g of powdered dimethylolpropionic acid are added at room temperature with stirring and the mixture is subsequently heated to about 60° C., so that reflux is established. The mixture is stirred under reflux for a further 6–8 h until all of the dimethylolpropionic acid has dissolved and the NCO number of the solution is from 7.7 to 7.9% NCO.

Blocking (C)

The solution obtained is cooled to about 40 to 45° C. and, with stirring, a solution of 339.0 g of ε-caprolactam in 497.3 g of acetone is added dropwise. Subsequently, the mixture is stirred under reflux to an NCO content <0.5 and then cooled, with stirring, to 30° C.

Obtaining Powder

In a Teflon-clad spray drying tower, the resulting non-neutralized solution is dried under an inert gas atmosphere, using a two-fluid nozzle (in order to generate fine particles) or a one-fluid nozzle (in order to generate relatively coarse particles) in cross-countercurrent mode.

Depending on the mode of spray drying, pulverulent polyisocyanate adducts having an average particle diameter of from 5 to 400 μm and bulk densities of from 40 to 500 g/l are obtained. The pulverulent polyisocyanate adducts obtained all feature residual solvent contents of <0.2% by weight.

Dispersion 213.0 g of deionized water admixed with 4.5 g of triethylamine is warmed to about 40° C. and 60.0 g of the non-neutralized pulverulent polyisocyanate adduct is added in portions with stirring. The stirring speed is increased and the mixture is heated to about 75° C. After a number of minutes at this temperature, the experiment is ended and the mixture is left to cool to room temperature.

This gives a virtually transparent dispersion having a solids content of 22.0% (to DIN 53216 at 105° C.), a pH of 8.3 and a viscosity of <30 mPa s (to DIN 53019 at D=200 s$^{-1}$). There is no coagulation or sedimentation on storage of the dispersion for a period of 6 months at room temperature or of 4 weeks at 50° C. During the dispersion can be used without restriction.

EXAMPLE 3

Direct Dispersion of Neutralized Pulverulent Polyisocyanate Adducts (Example 1) into other Binder Dispersions Dispersion in Acrylate Dispersions 200.0 g of an acrylic dispersion having a hydroxyl number of 98 gKOH/g, an acid number of 31 gKOH/g and a solids content of 36% by weight (monomer building blocks: hydroxyethyl acrylate, n-butyl acrylate, methyl methacrylate, acrylic acid, hydroxy-polyester acrylate) are heated to about 40° C. with moderate stirring, admixed with 56.7 g of pulverulent polyisocyanate adduct from Example 1, in portions, 166.0 g of water is added, and heating is continued to about 75° C. with stirring.

Cooling gives a virtually transparent aqueous dispersion having a solids content of 30.9% by weight (to DIN 53216 at 105° C.), a pH of 7.6 and a viscosity of 380 mPa s (to DIN 53019 at D=200 s$^{-1}$).

There is no coagulation or sedimentation when the dispersion is stored for a period of 6 months at room temperature or for 4 weeks at 50° C. During this period, the dispersion can be used without restriction. The system obtained may be used as a one-component acrylate-polyurethane system for high-quality baking enamels.

Dispersion in Polyurethane Polyol Dispersions 200.0 g of a polyurethane polyol dispersion having an OH number of 54 g KOH/g, a viscosity of about 200 mPa s (to DIN 53019 at D=200 s$^{-1}$), a pH of 8.4 and a solids content of 31.2% by weight are heated to about 40° C. with moderate stirring and admixed with 29.6 g of pulverulent polyisocyanate adduct from Example 1, in portion, 36.0 g of water is added, and heating is carried out to about 75° C. with intensified shear forces. On reaching the temperature, the procedure is ended and the dispersion is cooled to room temperature.

This gives a virtually transparent aqueous dispersion having a solids content of 34.4% by weight (to DIN 53216 at 105° C.), a pH of 8.5 and a viscosity of 399 mPa s (to DIN 53019 at D=200 s$^{-1}$).

There is no coagulation or sedimentation when the dispersion is stored for a period of 6 months at room temperature or for 4 weeks at 50° C. During this period, the dispersion may be used without restriction. The resultant dispersion may be used as a one-component polyurethane system for high-quality baking enamels.

EXAMPLE 4

Direct Dispersion of Non-neutralized Powder (Example 2) into other Binder Dispersions 200.0 g of an acrylic dispersion (acid number 41 mg KOH/g, hydroxyl number 98 mg KOH/g, solids content ~22.5%, pH 8.4, degree of neutralization 1.05) and 202.1 g of DI water are introduced and warmed to 40° C. with gentle stirring. At a peripheral speed of approximately 2.6 m/sec, 34.5 g of non-neutralized powder from Example 2 are added, the mixture is heated to about 85° C. with stronger stirring (~12 m/sec peripheral speed) and 52.1 g of deionized water at about 70° C. are added.

Cooling gives a visually cloudy, storage-stable dispersion having a solids content of 33%, a pH of 7.2 and a viscosity of 200 to 300 mPas.

EXAMPLE 5

Direct Dispersion of Non-neutralized Powders (Example 2) into other Binder Dispersions—targeted Setting of the Solids Content by Variation of the Degree of Neutralization Dispersions in accordance with Example 4 may be set in a targeted manner to a desired solids content (see table) by varying the theoretical degree of neutralization of the curing agent powders. This gives storage-stable 1K baking systems with the characteristics listed.

|   | Polyol[1] | Curing agent[2] | DMAE [3] | H$_2$O | DN[4] | SC[5] | pH | Visual appearance |
|---|---|---|---|---|---|---|---|---|
| a | 250.00 g | 166.10[6] g | — | — | 1.00 | 27.7 | 8.8 | cloudy + |
| b | 250.00 g | 36.78 g | 2.25 g | 70.00 g | 1.00 | 32.9 | 8.3 | cloudy − |
| c | 250.00 g | 36.78 g | 1.81 g | 30.00 g | 0.80 | 38.7 | 7.9 | cloudy + |
| d | 250.00 g | 36.78 g | 1.44 g | 10.00 g | 0.70 | 41.8 | 7.8 | cloudy/ cloudy + |
| e | 250.00 g | 36.78 g | 1.06 g | 10.00 g | 0.60 | 41.9 | 7.6 | cloudy/ cloudy + |

[1]: Polyurethane polyol dispersion (FC 32.0%, pH 8.3, η ~ 440 mPa s, OH number 54 mg KOH/g, acid number 21 mg KOH/g)
[2]: Non-neutralized curing agent powder from Example 2
[3]: Dimethylaminoethanol
[4]: Degree of neutralization
[5]: Solids content of the resultant dispersion in %
[6]: Dispersion of the curing agent powder in analogy to Example 1

German patent application 10047762.3 filed Sep. 27, 2000 is incorporated herein by reference.

The invention claimed is:

1. A solid, pulverulent, water-dispersible, blocked polyisocyanate adduct having particle diameters of from about 1 to 1000 μm, obtained by reacting, in a water-free, organic auxiliary solvent,
    at least one isocyanate component selected from the group consisting of aliphatic, cycloaliphatic and aromatic isocyanates, wherein said isocyanate has an average NCO functionality of 2–4
    with
    at least one hydrophilicizing component containing at least one group which is reactive toward the NCO groups, in an amount such that there is on average not more than one NCO-reactive function for each isocyanate molecule;
    blocking with at least one blocking agent from 95 to 100% of the NCO groups not reacting with the hydrophilicizing component;
    optionally neutralizing with at least one neutralizing agent; and
    removing the organic auxiliary solvent.

2. The blocked polyisocyanate adduct of claim 1, wherein the isocyanate component is at least one diisocyanate selected from the group consisting of 1,6-diisocyanatohexane (HDI), bis(4-isocyanatocyclohexyl)methane (HMDI), 1,5-diisocyanato-2-methylpentane (MPDI), 1,6-diisocyanato-2,4,4-trimethylhexane (TMDI) and 3-isocyanatomethyl-3,5,5-trimethylcyclohexyl isocyanate (IPDI).

3. The blocked polyisocyanate adduct of claim 2, wherein the diisocyanates have at least two isocyanate groups per molecule.

4. The blocked polyisocyanate adduct of claim 2, wherein the diisocyanate compound is prepared by trimerizing, allophanatizing, biuretizing or urethanizing the diisocyanates.

5. The blocked polyisocyanate adduct of claim 1, wherein the isocyanate is a product of at least one diisocyanate selected from the group consisting of 1,6-diisocyanatohexane (HDI), bis(4-isocyanatocyclohexyl)methane (HMDI), 1,5-diisocyanato-2-methylpentane (MPDI), 1,6-diisocyanato-2,4,4-trimethylhexane (TMDI) and 3-isocyanatomethyl-3,5,5-trimethylcyclohexyl isocyanate (IPDI) and at least one compound selected from the group consisting of polyols and polyamine.

6. The polyisocyanate adduct of claim 1, wherein the isocyanate is at least one isocyanate selected from the group consisting of IPDI and IPDI isocyanurate.

7. The polyisocyanate adduct of claim 1, wherein the isocyanate is at least one isocyanate selected from the group consisting of tetramethylenexylylene diisocyanate (TMXDI), 2,4-diisocyanatotoluene and its technical mixtures with 2,6-diisocyanatotoluene and 4,4'-diisocyanatodiphenylmethane and its technical mixtures with 2,4'-diisocyanatodiphenylmethane.

8. The polyisocyanate adduct of claim 1, wherein the hydrophilizing component is an ionic component is selected from the group consisting of monohydroxyalkylcarboxylic acids, polyhydroxyalkylcarboxylic acids, monohydroxyalkyl sulfonic acids, polyhydroxyalkylsulfonic acids, monohydroxyalkyl phosphonic acids, polyhydroxyalkylsulfonic acids, monofunctional aminocarboxylic acids, and polyfunctional aminocarboxylic acids.

9. The blocked polyisocyanate adduct of claim 1, wherein the hydrophilicizing component is a nonionic hydrophilicizing agent has at least one terminal hydroxyl group.

10. The blocked polyisocyanate adduct of claim 9, wherein the nonionic hydrophilicizing agent is polyethers is selected from the group consisting of polyethers containing 80–100% by weight of ethylene oxide units, based on the weight of the polyether, and polyethers containing 80–100% by weight of propylene oxide units, based on the weight of the polyether.

11. The blocked polyisocyanate adduct of claim 1, wherein the blocking agent is at least one agent selected from the group consisting of monofunctional alcohols, polyfunctional alcohols, phenols, oximes, CH-acidic compounds, NH-acidic compounds, glycol monoethers and amino alcohols.

12. The blocked polyisocyanate adduct of claim 11, wherein the blocking agent is at least one agent selected from the group consisting of caprolactam, diethylethanolamine, diisopropylamine, dialkyl malonates, acetone oxime, acetophenone oxime, methyl ethyl ketone oxime, triazole and dimethylpyrazole.

13. The blocked polyisocyanate adduct of claim 1, wherein said neutralizing agent is present in an amount greater than 0% by weight, based on the weight of the adduct.

14. The blocked polyisocyanate adduct of claim 13, wherein the neutralizing agent is capable of forming salts.

15. The blocked polyisocyanate adduct of claim 14, wherein the neutralizing agent is an agent selected from the group consisting of organic acids, inorganic acids, organic bases, and inorganic bases.

16. The blocked polyisocyanate adduct of claim 15, wherein the base used as a neutralizing agent is selected from the group consisting of ammonia, amines and amino alcohols.

17. The blocked polyisocyanate adduct of claim 15, wherein the acid used as a neutralizing agent is selected from the group consisting of formic, acetic, lactic and benzoic acid.

18. The blocked polyisocyanate adduct of claim 15, wherein the degree of neutralization of the neutralizing agent is 0.5–1.0.

19. The blocked polyisocyanate adduct of claim 1, wherein said adduct further comprises admixed hydrophobic blocked isocyanates.

20. The blocked polyisocyanate adduct of claim 1, wherein the particle diameters are from 1 to 300 μm.

21. A process for the water-free preparation of a solid, pulverulent, water-dispersible, blocked polyisocyanate adduct having particle diameters of from about 1 to 1000 μm comprising:

reacting in an organic auxiliary solvent, at least one isocyanate component selected from the group consisting of aliphatic, cycloaliphatic and aromatic isocyanates, wherein said isocyanate has an average NCO functionality of 2–4 with at least one hydrophilicizing component containing at least one group which is reactive toward the NCO groups, in an amount such that there is on average not more than one NCO-reactive function for each isocyanate molecule;

blocking with at least one blocking agent from 95 to 100% of the NCO groups not reacting with the hydrophilicizing component;

optionally neutralizing with at least one neutralizing agent; and removing the organic auxiliary solvent.

22. The process of claim 21, wherein the particle diameters are from 1 to 300 μm.

* * * * *